(12) United States Patent
Neumann

(10) Patent No.: US 6,243,276 B1
(45) Date of Patent: Jun. 5, 2001

(54) POWER SUPPLY SYSTEM FOR BATTERY OPERATED DEVICES

(75) Inventor: Peter W. Neumann, Chicago, IL (US)

(73) Assignee: S-B Power Tool Company, Chicago, IL (US)

( * ) Notice: Subject to any disclaimer, the term of this patent is extended or adjusted under 35 U.S.C. 154(b) by 0 days.

(21) Appl. No.: 09/307,192

(22) Filed: May 7, 1999

(51) Int. Cl.[7] .............................. H02H 7/10; H02H 7/125
(52) U.S. Cl. ........................ 363/53; 363/50; 323/907; 323/901
(58) Field of Search ........................... 323/907, 908, 323/901; 363/53, 50

(56) References Cited

U.S. PATENT DOCUMENTS

| D. 297,928 | 10/1988 | Harpley et al. . |
|---|---|---|
| D. 328,057 | 7/1992 | Prager et al. . |
| 3,354,271 | 11/1967 | McDermaid . |

(List continued on next page.)

FOREIGN PATENT DOCUMENTS

| 2309915 | 9/1974 | (DE) . |
|---|---|---|
| 2907968 | 9/1980 | (DE) . |
| 3021689 | 12/1981 | (DE) . |
| 3046860 | 7/1982 | (DE) . |
| 3239847 | 5/1983 | (DE) . |
| 3247047 | 6/1983 | (DE) . |
| 3248217 | 6/1984 | (DE) . |
| 3300193 | 7/1984 | (DE) . |
| 3611884 | 10/1987 | (DE) . |
| 3836990 | 5/1990 | (DE) . |
| 4013022 | 11/1990 | (DE) . |
| 4100452 | 7/1991 | (DE) . |
| 4014629 | 11/1991 | (DE) . |
| 4119941 | 1/1993 | (DE) . |
| 4142699 | 6/1993 | (DE) . |
| 4301958 | 2/1994 | (DE) . |
| 9610106 | 9/1997 | (DE) . |
| 9824201 | 12/1998 | (DE) . |

Primary Examiner—Peter Wong
Assistant Examiner—Bao Q. Vu
(74) Attorney, Agent, or Firm—Greer, Burns & Crain, Lt

(57) ABSTRACT

A power supply converts an AC input voltage to a DC output voltage and supplies the DC output voltage to power devices. The power supply includes a housing, a transformer provided in the housing for reducing a voltage level of the AC input voltage and a thermal protection device thermally connected between the AC input voltage and the transformer for electrically disconnecting the AC input voltage from the transformer when activated responsive to the transformer exceeding a predetermined temperature. A rectifier is electrically connected to the transformer for rectifying the AC input voltage reduced by the transformer into the DC output voltage which is supplied to the power devices.

57 Claims, 5 Drawing Sheets

U.S. PATENT DOCUMENTS

| | | |
|---|---|---|
| 3,518,524 | 6/1970 | Roszyk . |
| 3,609,457 | 9/1971 | Squiers . |
| 3,757,194 | 9/1973 | Weber et al. . |
| 3,928,792 * | 12/1975 | Mullersman et al. ............... 320/154 |
| 4,084,123 | 4/1978 | Lineback et al. . |
| 4,118,615 | 10/1978 | Leibundgut . |
| 4,240,022 | 12/1980 | Kilinskis et al. . |
| 4,241,285 | 12/1980 | Golonka, Sr. et al. . |
| 4,266,257 | 5/1981 | Rudich, Jr. . |
| 4,335,414 | 6/1982 | Weber . |
| 4,415,959 | 11/1983 | Vinciarelli . |
| 4,430,681 | 2/1984 | Benzing . |
| 4,441,146 | 4/1984 | Vinciarelli . |
| 4,507,368 | 3/1985 | Hashimoto . |
| 4,528,492 * | 7/1985 | Inaniwa et al. ...................... 320/150 |
| 4,648,020 | 3/1987 | Vinciarelli . |
| 4,675,797 | 6/1987 | Vinciarelli . |
| 4,712,055 | 12/1987 | Houser, Jr. . |
| 4,827,104 | 5/1989 | Foster, Jr. . |
| 4,873,453 | 10/1989 | Schmerda et al. . |
| 4,926,106 * | 5/1990 | Tanis .................................... 320/150 |
| 5,013,993 * | 5/1991 | Bhagwat et al. ..................... 320/150 |
| 5,095,259 | 3/1992 | Bailey et al. . |
| 5,144,217 | 9/1992 | Gardner et al. . |
| 5,208,525 | 5/1993 | Lopic et al. . |
| 5,217,395 | 6/1993 | Bailey et al. . |
| 5,278,747 | 1/1994 | Falt et al. . |
| 5,293,098 * | 3/1994 | Brownell ............................ 315/169.3 |
| 5,453,904 * | 9/1995 | Higashiyama et al. ................ 361/94 |
| 5,483,437 | 1/1996 | Tang . |
| 5,497,245 | 3/1996 | Uchida . |
| 5,602,455 | 2/1997 | Stephens et al. . |
| 5,629,602 | 5/1997 | Makino . |
| 5,633,096 | 5/1997 | Hattori . |
| 5,645,746 * | 7/1997 | Walsh ................................... 219/505 |
| 5,715,156 | 2/1998 | Yilmaz et al. . |
| 5,721,481 | 2/1998 | Narita et al. . |
| 5,731,683 | 3/1998 | Nakanishi . |
| 5,783,927 | 7/1998 | Chen . |
| 5,801,513 | 9/1998 | Smith et al. . |
| 5,805,068 | 9/1998 | Bradus . |
| 5,814,947 * | 9/1998 | Brownell ............................ 315/169.3 |
| 5,834,903 * | 11/1998 | Christian ............................. 315/219 |
| 5,847,541 | 12/1998 | Hahn . |
| 5,864,458 | 1/1999 | Duffy et al. . |
| 5,973,605 * | 10/1999 | Yamanashi ........................... 340/653 |

\* cited by examiner

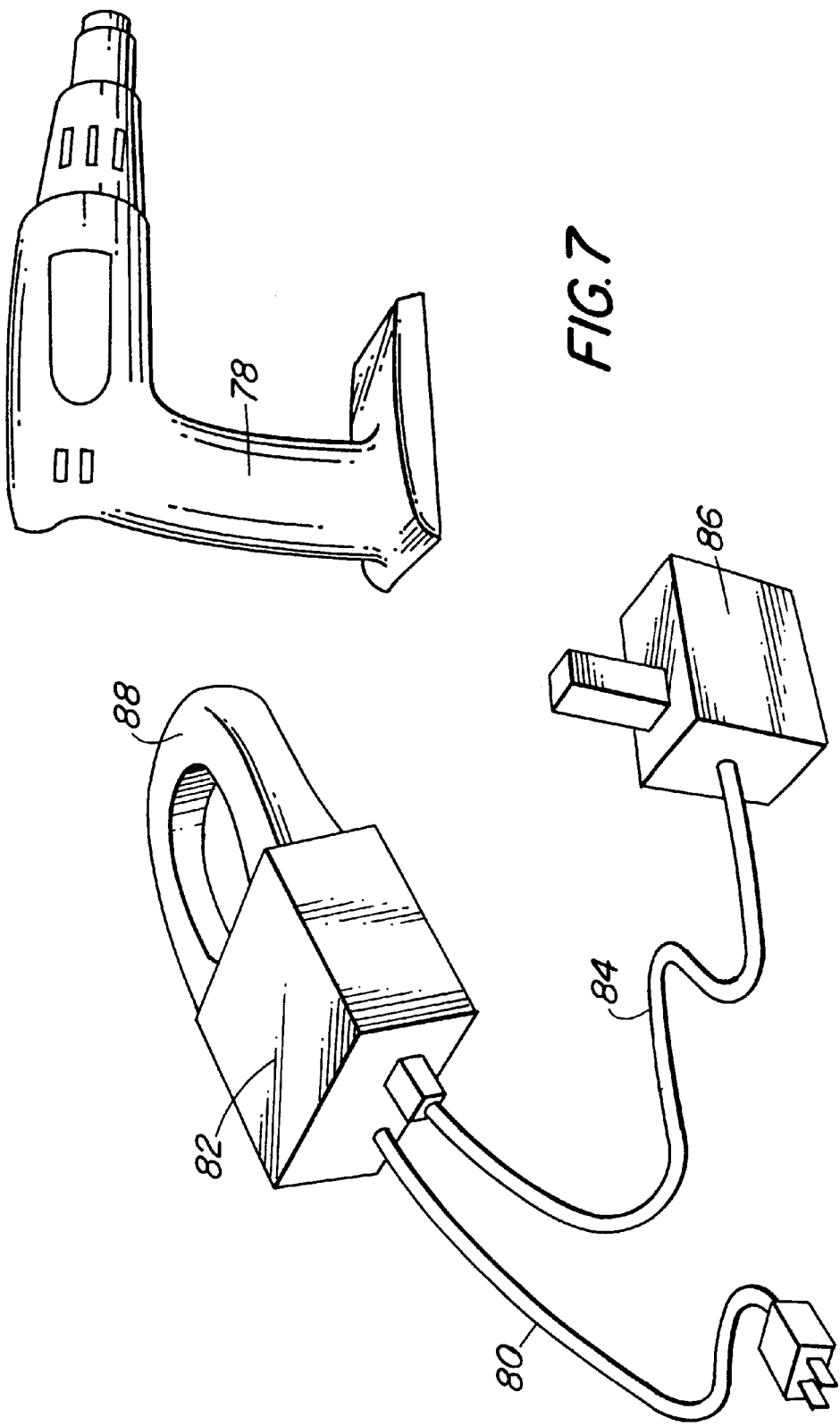

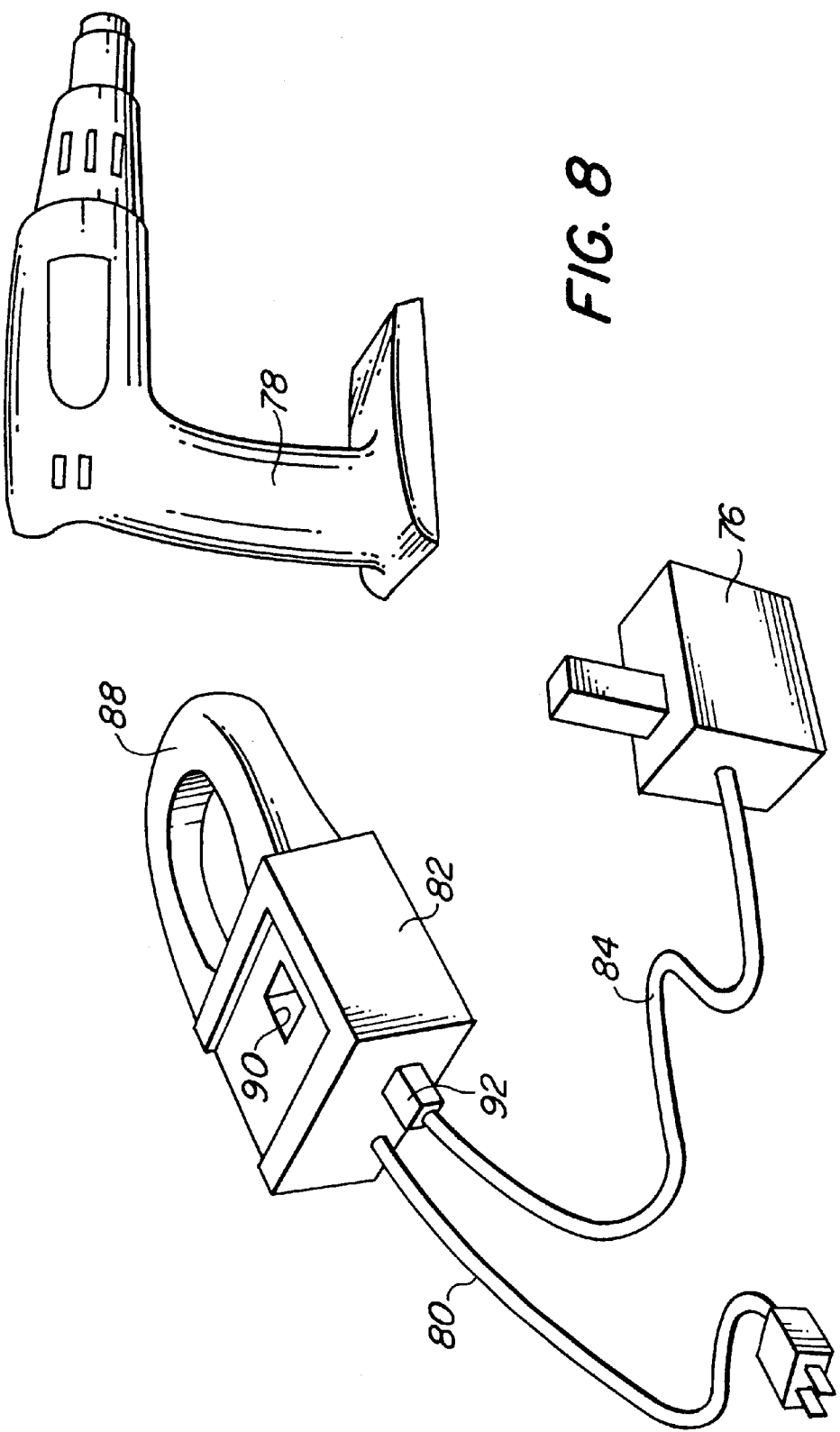

POWER SUPPLY SYSTEM FOR BATTERY OPERATED DEVICES

The present invention generally relates to power supplies for battery operated devices, and more particularly to an AC power supply system which is adapted to supply DC power to battery operated devices.

It is common for power devices or tools such as drills, circular saws, sanders, etc., to be battery powered. Battery power supplies come in the form of cordless power packs which are adapted to lock directly onto the tools. One disadvantage associated with the battery power supplies, however, is that the batteries discharge with use, and have to be recharged periodically. The batteries could be recharged during the interim when the tool is not being used so that the batteries would be fully charged when the tool is ready for use. However, such opportune time for recharging the batteries is not always available. Further, even if the batteries are fully charged, they may still discharge on their own if they are stored for an extended period of time.

Many power tool users carry an alternate set of batteries for replacing the main batteries when they are discharged. However, this does not completely eliminate the problems associated with battery power supplies, because the backup batteries are also subject to the same disadvantages described above. Another known solution involves employing a power transformer device for converting AC power to DC power and supplying the converted DC power to the tool. A disadvantage of this solution is that the transformer contained in the device tends to heat-up and damage the electronics of the transformer device. Increasing the size of the transformer would prevent or at least alleviate the over-heating problem. However, a power supply having a large transformer would not be desirable because the size and the weight of the power supply would make it difficult to use the tool.

Accordingly, it is a primary objective of the present invention to provide an improved system for supplying power to a battery operated power device.

Another object of the present invention to provide an improved power supply system which does not require being recharged and does not discharge during the operation of the power device.

Still another object of the present invention is to provide such an improved power supply system which is constructed and adapted to replace an existing battery supply.

Yet another object of the present invention is to provide such an improved power supply system including a protection circuit which automatically prevents the temperature of the supply system from reaching an undesirable point which may damage the supply system.

A related object of the present invention is to provide such an improved power supply system having a relatively small power transforming component.

A further object of the present invention is to provide such an improved power supply system including indicating devices which operate correspondingly with the protection device to inform the user of the operating condition of the power supply system.

It is also an object of the present invention to provide such an improved power supply system which is adapted to be the original power supply for a tool or a replacement or a substitute power supply for an existing battery-operated tool.

Other objects and advantages will become apparent upon reading the following detailed description, in conjunction with the attached drawings, in which:

FIG. 7 is a perspective view of another embodiment of a housing of the present invention including an adapter unit; and FIG. 8 is a perspective view of the housing of FIG. 7 adapted to also function as a battery charger.

DETAILED DESCRIPTION

The present invention is directed to a power supply which is adapted to plug into a conventional AC outlet and supply DC power to battery operated power tools. The power supply includes a temperature protection system which automatically trips to prevent the power supply from being damaged when the temperature of the power supply exceeds a predetermined point. Latching devices are also provided in the power supply to allow the user to resume power to the tool after the protection system resets itself Broadly stated, the present invention is directed to a power supply for converting an AC input voltage to a DC output voltage and supplying the DC output voltage to power devices. The power supply includes a housing, a transformer provided in the housing for reducing the voltage level of the AC input voltage and a thermal protection device connected between the AC input voltage and the transformer for electrically disconnecting the AC input voltage from the transformer when activated responsive to the transformer exceeding a predetermined temperature. A rectifier is electrically connected to the transformer for rectifying the AC input voltage reduced by the transformer into the DC output voltage which is supplied to the power devices.

In accordance with another embodiment of the present invention, a power supply converts an AC input voltage to a DC output voltage and supplies the DC output voltage to power devices which are adapted to be operated by batteries. The power supply includes a housing, a transformer provided in the housing for reducing a voltage level of the AC input voltage and a thermal protection device connected to the transformer for electrically disconnecting the AC input voltage from the transformer when activated responsive to the transformer exceeding a predetermined temperature. A latching circuit is connected between the AC input voltage and the transformer for allowing the input voltage to be applied to the transformer, when the latching circuit is activated after the temperature of the transforming means falls below the predetermined temperature and the thermal protection device has been deactivated. Also, a rectifier is electrically connected to the transformer for rectifying the AC input voltage reduced by the transformer into the DC output voltage which is supplied to the battery powered devices.

Figure 1:
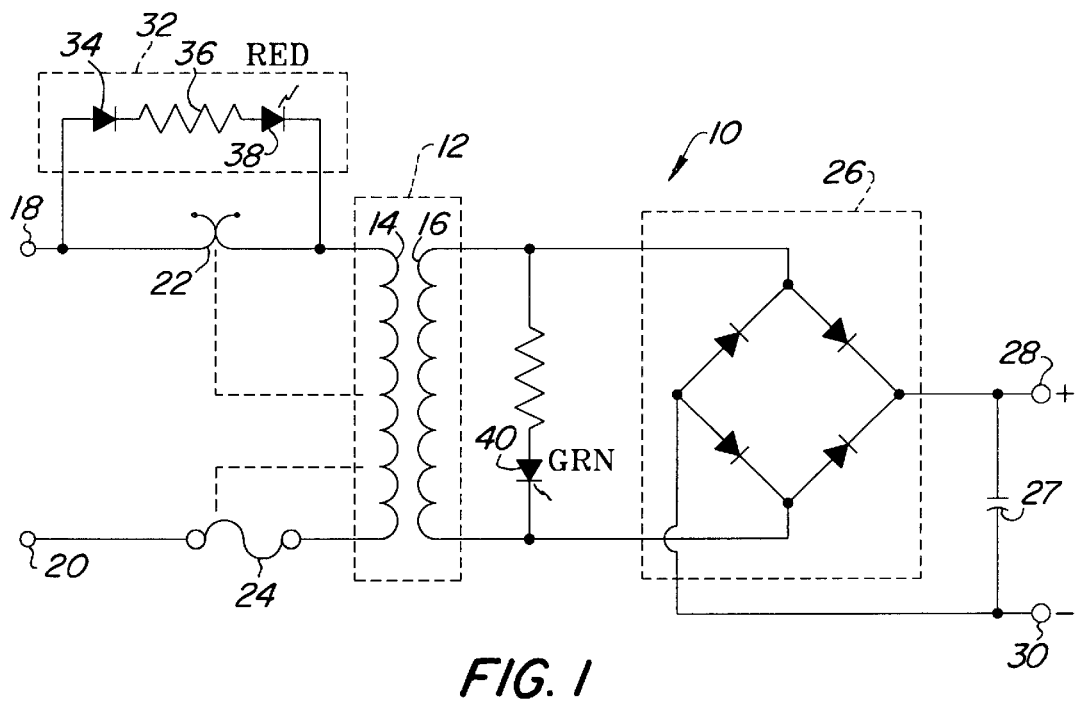
FIG. 1 is a detailed schematic diagram of the circuitry of an embodiment of the present invention.

Turning now to FIG. 1, the circuitry of the present power supply is indicated generally at 10 and includes a step-down transformer 12, which transforms the input voltage of generally 120 VAC into that which is suitable for supplying power to tools and other motorized appliances such as drills, circular saws, jigsaws, sanders, flashlights, lawn and garden tools, inflators, etc. The transformer 12 includes a primary winding 14 on the input side and a secondary winding 16 on the output side of the transformer. The primary winding 14 receives the input voltage via a pair of input terminals 18, 20 which are connected to an electrical cord that plugs into a conventional household AC outlet.

An automatic reset type thermostat 22 is electrically connected between the input terminal 18 and the primary winding 14 and thermally coupled to the primary winding. Alternatively, the thermostat 22 may also be thermally coupled to the secondary winding 16 (best shown in FIG. 5). The thermostat 22 trips or opens when the transformer 12 exceeds a predetermined temperature, preferably at approximately 70° C., for example, and automatically resets or closes when the temperature of the transformer falls below the predetermined temperature. The thermostat 22 has a preferred reset hysteresis of at least one minute to allow the transformer 12 sufficient time to cool. In this manner, the thermostat 22 operates effectively to prevent the power supply from overheating, thus allowing smaller components, particularly the transformer 12, to be used in the power supply 10.

In addition to the automatic reset thermostat 22, a back-up thermal protection device 24 is electrically connected between the input terminal 20 and the primary winding 14. Unlike the automatic reset thermostat 22, the protection device 24 is a "one-shot" device or a fuse which cannot be reset. Accordingly, the back-up thermal protection device 24 trips at a higher transformer temperature than the automatic reset thermostat 22, preferably at approximately 130° C., for example.

The power supply 10 further includes a rectifier 26 connected to the secondary winding 16 of the transformer 12 for rectifying the AC voltage which has been stepped-down by the transformer to a DC voltage. Those of ordinary skill in the art will recognize that the rectifier 26 is a full-bridge type. The DC voltage output by the rectifier 26 is filtered by at least one capacitor 27 and supplied to the power device or tool via output terminals 28, 30.

In accordance with one aspect of the present invention, an indicator circuit 32 is connected between the input terminal 18 and the primary winding 14 and in parallel with the automatic reset thermostat 22. The indicator circuit 32 includes a serially connected diode 34, a current reducing resistor 36 and a light emitting diode (LED) 38. When the reset thermostat 22 trips, the current flow is directed through the circuit 32 where it causes the RED LED 38 to illuminate. It should be understood that the resistor 36 substantially reduces the input current so that the current generated in the secondary winding 16, if any, is negligible. When illuminated, the RED LED 38 informs the user that power to the tool has been interrupted as a protective measure until the power supply 10 cools to an acceptable temperature. On the output side of the transformer 12, a green (GRN) light emitting diode (LED) 40 is connected across the secondary winding 16. The GRN LED 40 is adapted to illuminate alternately with the RED LED 38 when there is a current flow through the secondary winding 16. In other words, the GRN LED 40 illuminates only when the reset thermostat 22 is closed and the input current flows through the reset thermostat to the primary winding 14 without first flowing through the indicator circuit 32. When illuminated, the GRN LED 40 informs the user that the power supply 10 is in condition to supply power to the tool.

Figure 2:
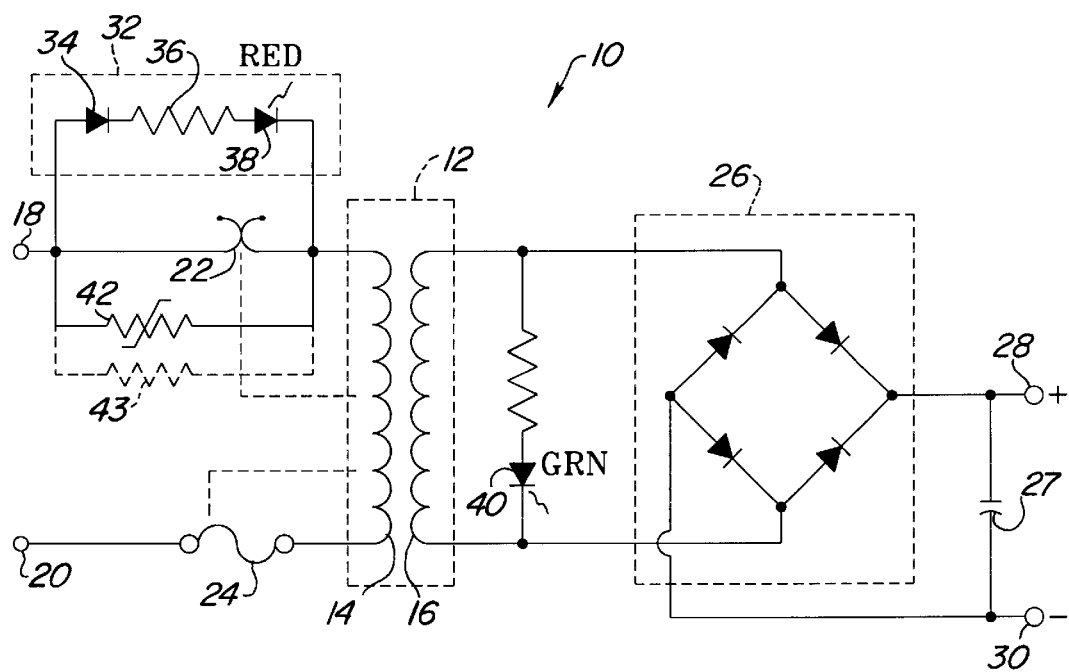
FIG. 2 is a detailed schematic diagram of the circuitry of FIG. 1 including a latching device.

In accordance with another aspect of the present invention and referring to FIG. 2, a positive temperature coefficient device (PTC) 42 is connected parallel and thermally coupled to the automatic reset thermostat 22. Under normal conditions, the PTC 42 is in a low temperature, low resistance state. However, when the current through the PTC 42 increases excessively, the PTC 42 will be "tripped," i.e., converted to a high temperature, high resistance state, so as to significantly reduce the current. Generally, the PTC 42 will remain in the tripped state, even if the temperature and/or current flow returns to their normal levels, until the PTC has been disconnected from the power source and allowed to cool. In the present invention, the PTC 42 is adapted to trip when the automatic reset thermostat 22 trips. In the tripped state, the PTC 42 acts as a permanent heater or a latch which keeps the reset thermostat 22 in the open or activated position even when the transformer 12 cools below the predetermined temperature. The thermostat 22 can reset itself only after the AC power has been removed from the power supply 10, thereby resetting the PTC 42, and after the primary winding 14 has cooled below the predetermined temperature. This arrangement prevents the tool from starting unintentionally. Instead of the PTC 42, it is also possible to provide a resistor 43 (shown in phantom) in thermal contact with the thermostat 22. Similar to the PTC 42, the resistor 43 would act as a heater and prevent the thermostat 22 from closing until both the transformer 12 and the resistor 43 have cooled to an acceptable temperature.

Figure 3:
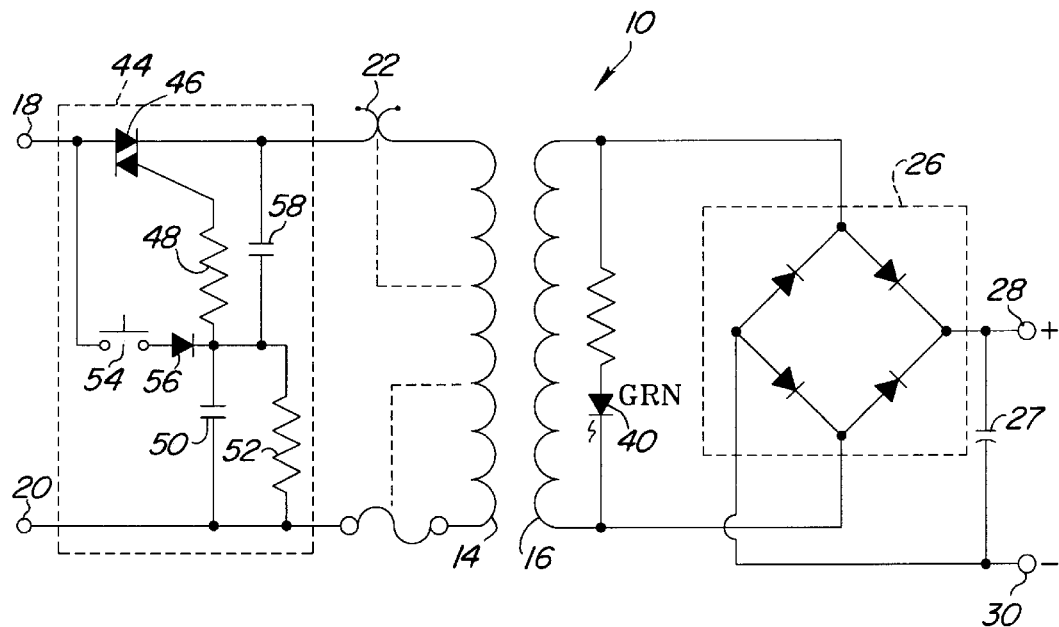
FIG. 3 is detailed schematic diagram of the circuitry ofanother embodiment of the present invention.

Turning now to FIG. 3, the present invention also includes an electronic latching circuit 44, which similar to the PTC 42 described above (best shown in FIG. 2), is adapted to prevent the tool from unintentional starts. The latching circuit 44 includes a triac 46 connected in series with the thermostat 22. The gate electrode of the triac 46 is connected to one end of a gate resistor 48, the other end of which is connected to a parallel combination of a storage capacitor 50 and a bleeder resistor 52. The other ends of the capacitor 50 and the resistor 52 are connected to the input terminal 20. A momentary reset button 54 which is in series with a diode 56 is connected between the input terminal 18 and the gate resistor 48. The diode 56 rectifies the AC input to present a DC signal to the gate resistor 48.

Once the thermostat 22 trips, the triac 46 prevents the current from flowing through the primary winding 14 even after the thermostat has automatically resets itself The power supply 10 remains in this state until the reset button 54 is depressed by the user, causing the gate electrode of the triac 46 to be triggered or energized and allowing the current to flow through the triac and to the thermostat 22, if it has been reset, and to the primary winding 14. Preferably, a filter capacitor 58 is provided in parallel with the gate resistor 48 to prevent false triggering of the triac 46.

Figure 4:
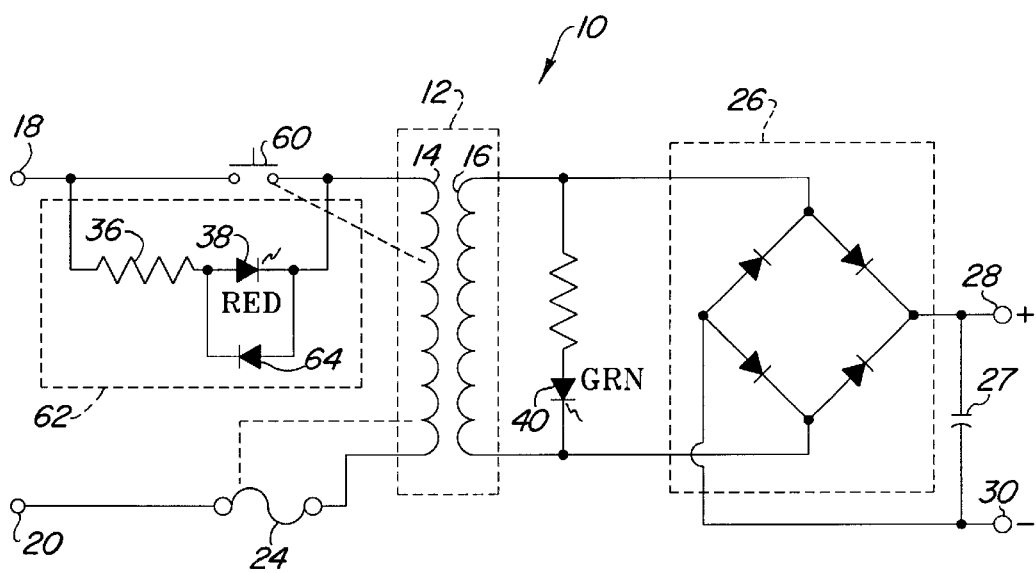
FIG. 4 is a detailed schematic diagram of the circuitry of yet another embodiment of the present invention.

In accordance with another aspect of the present invention and referring to FIG. 4, the preferred arrangement for preventing unintentional start-up of the tool includes a manual reset thermostat 60 in place of the automatic reset thermostat 22 described above. An indicator circuit 62 including the current limiting resistor 36 in series with the RED LED 38 is connected in parallel with the manual reset thermostat 60. The indicator circuit 62 also includes a diode 64 in parallel with and in reverse direction to the RED LED 38 for protecting the LED from a reverse voltage breakdown.

Because the thermostat 60 does not automatically reset itself, but rather must be reset manually by the user after the temperature of the primary winding 14 falls below the predetermined temperature, the manual reset thermostat 60 prevents the tool from starting unintentionally. Similar to the indicator circuit 32 described above (best shown in FIGS. 1 and 2), the indicator circuit 62 also informs the user that the power supply 10 is in a thermal overload condition and that the current flow has been interrupted.

Figure 5:
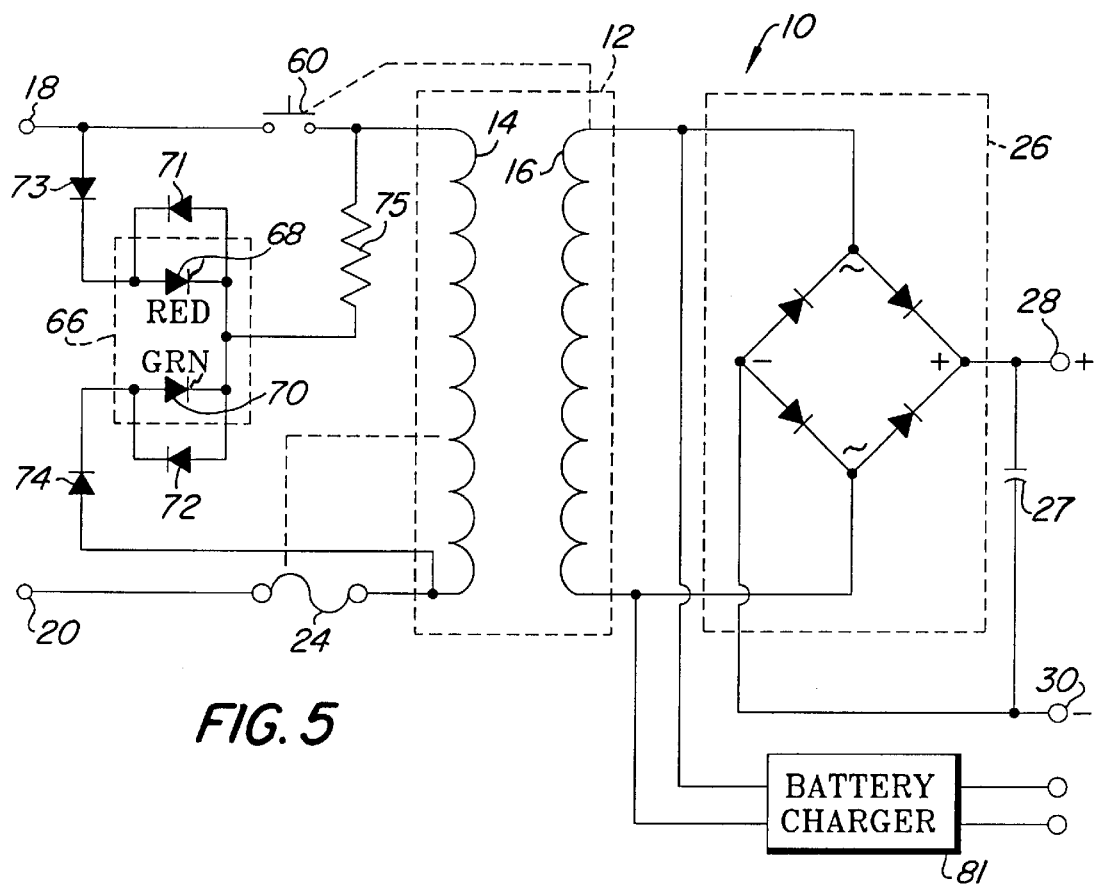
FIG. 5 is a detailed schematic diagram of the circuitry of still another embodiment of the present invention including a battery charger.

In accordance with another aspect of the present invention and referring to FIG. 5, a single bi-color LED 66 incorporating a red (RED) LED 68 and a green (GRN) LED 70 is employed as an indicating device for informing the user of the condition of the power supply 10. Thus, the bi-color LED 66 performs the same functions as the above described RED and GRN LEDs 38, 40 (best shown in FIGS. 1, 2 and 4). However, in this aspect of the invention, both LEDs 68, 70 are connected to the primary winding 14. The LEDs 68 and 70 respectively have diodes 71, 72 connected in parallel and in opposite direction therewith for protection against a back bias when the LEDs 68, 70 are not conducting. Diodes 73, 74 are also respectively connected in series with the LEDs 68, 70 and a current reducing resistor 75 is also connected in series with the bi-color LED 66. Those of ordinary skill in the art will recognize that the bi-color LED 66 and the diodes 71, 72, 73, 74 are arranged such that the RED LED 68 illuminates only when the thermostat 60 is open and the GRN LED 70 when closed. It should be understood that while the circuit 10 of FIG. 5 is shown with manual reset type thermostat 60, an automatic reset type thermostat 22 (best shown in FIGS. 1–3) can also be utilized.

Figure 6:
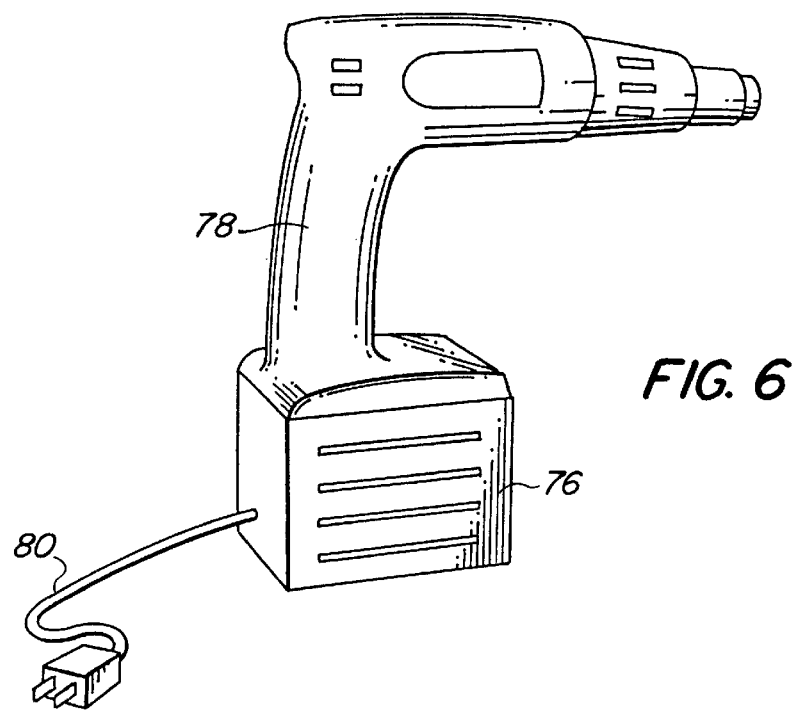
FIG. 6 is a perspective view of a housing of the present invention shown attached to a power tool.

Turning now to FIG. 6, the circuitry of the power supply 10 is provided in a housing 76 which is constructed and adapted to directly engage and lock into the battery compartment of a tool 78 or any other motorized appliances, such as drills, circular saws, jigsaws, sanders, flashlights, lawn and garden tools, inflators, etc., which the power supply is intended to power. In FIGS. 6–8, a drill is shown only as an example of the tool 78. An electrical cord 80 extends into the housing 76 and is connected to the input terminals 18, 20 (connection not shown) for supplying the AC input voltage to the power supply 10 from a conventional AC outlet (not shown). When the housing 76 and the tool 78 are interlocked together, the output terminals 28, 30 (best shown in FIGS. 1–5) are adapted to make contact with the terminals within the tool so that DC power can be supplied to the tool from the power supply 10 (terminal connections not shown). It should be noted that the housing 76 generally resembles conventional battery packs used in power tools. As such, the power supply 10 can be directly substituted for those battery packs in existing power tools without any modifications.

In accordance with another embodiment of the present invention and referring to FIG. 7, the power supply 10 is provided in a housing 82 which has the AC electrical cord 80 that supplies the input voltage and a DC cord 84 for carrying the DC power generated by the power supply. The other end of the cord 84 is connected to an adapter pack 86 which is constructed to engage the power tool 78. Similar to the housing 76 described above with respect to FIG. 6, the adapter pack 86 is also adapted to replace conventional battery packs used in many power tools and other motorized appliances. In the preferred embodiment, the housing 82 includes a handle 88 which allows the power supply to be easily and conveniently carried and also hung out of the way of the user.

Turning now to FIG. 8, another embodiment of the present invention includes a battery charger 81 (shown in FIG. 5) incorporated in the housing 82 of the power supply 10 for charging the battery pack (not shown) of the tool 78. A charging port 90 is provided on the housing 82 for receiving the battery pack. The battery charger 81 is connected to the secondary winding 16 of the transformer 12 so as to allow the user to charge the battery pack even while the tool 78 is being operated. In the preferred embodiment, the DC cord 84 attaches to the housing 82 via a cord plug 92 which allows user to remove the DC cord from the housing, so that the user is not encumbered by the cord and the adapter pack 76 when the housing is being employed separately as a battery charger.

From the foregoing description, it should be understood that an improved power supply system for power tools and any other motorized appliances has been shown and described which has many desirable attributes and advantages. It has a thermal protection circuit for protecting the power supply against overheating and latching circuits which prevent the power tool from unintentional start-ups. Also, the circuitry of the power supply is provided in housing configurations which allow the power supply to act as substitutes for existing battery packs.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A power supply apparatus for converting an AC input voltage to a DC output voltage and supplying the DC output voltage to a power tool, said apparatus comprising:
   a housing constructed and adapted to be removably coupled to the power tool;
   transforming means provided in said housing and adapted to be electrically connected to the AC input voltage for reducing a voltage level of the AC input voltage;
   first thermal protection means thermally connected to said transforming means for electrically disconnecting the AC input voltage from said transforming means when activated responsive to said transforming means exceeding a predetermined temperature; and
   means electrically connected to said transforming means for rectifying the AC input voltage reduced by said transforming means into the DC output voltage which is adapted to be supplied to the power tool.

2. The apparatus as defined in claim 1 wherein said transforming means is a step-down transformer including a primary winding and a secondary winding.

3. The apparatus as defined in claim 2 wherein said first thermal protection means is thermally connected to one of said primary winding and said secondary winding.

4. The apparatus as defined in claim 3 wherein said first thermal protection means is a resettable thermostat which automatically resets to electrically connect the AC input voltage to said transformer through said thermostat when said temperature of said transformer falls below said predetermined temperature.

5. The apparatus as defined in claim 4 wherein said predetermined temperature is approximately 70° C.

6. The apparatus as defined in claim 4 further comprising an indicator circuit connected in parallel with said first thermal protection means and including first indicating means for indicating to an operator that said temperature of said transforming means has exceeded said predetermined temperature, when said first thermal protection means is activated.

7. The apparatus as defined in claim 6 wherein said indicator circuit is connected to said primary winding and includes a diode and a current reducing resistor in series with said first indicating means.

8. The apparatus as defined in claim 7 further comprising second indicating means connected to said secondary winding, said second indicating means being adapted to be energized when said first thermal protection means is not activated.

9. The apparatus as defined in claim 8 wherein said first and said indicating means are LEDs.

10. The apparatus as defined in claim 3 further comprising second thermal protection means connected to said primary winding for electrically disconnecting said transformer from the AC input voltage when said temperature of said transformer exceeds a maximum temperature which is greater than said predetermined temperature.

11. The apparatus as defined in claim 10 wherein said second thermal protection means is a thermal fuse.

12. The apparatus as defined in claim 1 wherein said first thermal protection means is a resettable thermostat which automatically resets to electrically connect the AC input voltage to said transforming means through said thermostat when said temperature of said transforming means falls below said predetermined temperature.

13. The apparatus as defined in claim 12 further comprising latching means operatively connected in parallel with said thermostat for allowing said thermostat to reset after said temperature of said transforming means falls below said predetermined temperature and after a supply of the AC input voltage to said latching means is at least momentarily interrupted.

14. The apparatus as defined in claim 13 wherein said latching means is one of a positive temperature coefficient device and a resistor in thermal communication with said thermostat.

15. The apparatus as defined in claim 13 further comprising an indicator circuit connected in parallel with said first thermal protection means and including first indicating means for indicating to an operator that said temperature of said transforming means has exceeded said predetermined temperature, when said first thermal protection means is activated.

16. The apparatus as defined in claim 15 wherein said indicator circuit is connected to said transforming means and includes a diode and a current reducing resistor in series with said first indicating means.

17. The apparatus as defined in claim 16 further comprising second indicating means connected to said transforming means, said second indicating means being adapted to be energized when said first thermal protection means is not activated.

18. The apparatus as defined in claim 17 wherein said first and said indicating means are LEDs.

19. The apparatus as defined in claim 1 wherein said thermal protection means is a manual reset thermostat which is adapted to be reset by a user when said temperature of said transforming means falls below said predetermined temperature.

20. The apparatus as defined in claim 19 wherein said manual reset thermostat is a Thermo-Disc (TOD) type manual reset button.

21. The apparatus as defined in claim 19 further comprising an indicator circuit connected in parallel with said first thermal protection means and including first indicating means for indicating to an operator that said temperature of said transforming means has exceeded said predetermined temperature, when said first thermal protection means is activated.

22. The apparatus as defined in claim 21 wherein said bypass indicator circuit includes a current limiting resistor in series with said indicating means.

23. The apparatus as defined in claim 22 wherein said indicating means is a LED.

24. The apparatus as defined in claim 23 wherein said indicator circuit further includes a diode connected in parallel with said LED for protecting said LED from a reverse voltage breakdown.

25. The apparatus as defined in claim 21 wherein said indicator circuit includes a first diode and a current limiting resistor connected in series with said indicating means.

26. The apparatus as defined in claim 25 wherein said indicating means is a bi-color LED which is adapted to illuminate a first color when said temperature of said first thermal protection means exceeds said predetermined temperature.

27. The apparatus as defined in claim 26 further comprising a second diode connected in series with said bi-color LED and said current limiting resistor for energizing said LED to illuminate a second color when said predetermined temperature is not exceeded and said thermal protection means is not activated.

28. The apparatus as defined in claim 27 further comprising a pair of third diodes connected to said LED for protecting said LED from a reverse voltage breakdown.

29. The apparatus as defined in claim 1 wherein said rectifying means is a full-wave AC to DC rectifier.

30. The apparatus as defined in claim 1 further comprising second thermal protection means connected to said transforming means for electrically disconnecting said transforming means from the AC input voltage when said temperature of said transforming means exceeds a maximum temperature which is greater than said predetermined temperature.

31. The apparatus as defined in claim 30 wherein said second thermal protection means is a thermal fuse.

32. The apparatus as defined in claim 1 further comprising an electrical cord connected to said housing for supplying the AC input voltage to said transforming means.

33. A power supply apparatus for converting an AC input voltage to a DC output voltage and supplying the DC output voltage to a power tool, said apparatus comprising:

a housing;

transforming means provided in said housing and adapted to be electrically connected to the AC input voltage for reducing a voltage level of the input voltage;

first thermal protection means thermally connected to said transforming means for electrically disconnecting the AC input voltage from said transforming means when activated responsive to said transforming means exceeding a predetermined temperature;

means electrically connected to said transforming means for rectifying the AC input voltage reduced by said transforming means into the DC output voltage which is supplied to the power tool; and an adapter electrically connected to said housing and constructed and adapted to be removably coupled to a battery compartment of the power tool for supplying the DC output voltage produced by said rectifying means to the power tool.

34. The apparatus as defined in claim 33 wherein said housing further includes a battery charger and a receiving port adapted to receive the batteries.

35. The apparatus as defined in claim 34 wherein said battery charger is electrically and operatively connected to said transforming means.

36. The apparatus as defined in claim 34 wherein said housing includes a holding member.

37. The apparatus as defined in claim 33 wherein said housing includes a holding member.

38. A power supply apparatus for converting an AC input voltage to a DC output voltage and supplying the DC output voltage to a power tool, said apparatus comprising:

a housing constructed and adapted to be removably coupled to the power tool;

transforming means provided in said housing and adapted to be electrically connected to the AC input voltage for reducing a voltage level of the AC input voltage;

first thermal protection means thermally connected to said transforming means for electrically disconnecting the AC input voltage from said transforming means when activated responsive to said transforming means exceeding a predetermined temperature;

latching means connected between said AC input voltage and said transforming means for allowing said AC input voltage to be applied to said transforming means when said latching means is activated after said first thermal protection means has been deactivated; and means electrically connected to said transforming means for rectifying the AC input voltage reduced by said transforming means into the DC output voltage which is adapted to be supplied to the power tool.

39. The apparatus as defined in claim 38 wherein said latching means includes a reset push button operationally connected to a triac which is connected in series with said first thermal protection means, said triac allowing said input voltage to be applied to said transforming means when said reset push button is activated and said temperature of said transforming means is below said predetermined temperature.

40. The apparatus as defined in claim 39 wherein said latching means further includes a diode connected in series with said reset push button for applying a DC gate voltage to a gate of said triac, a first resistor having a first end connected to said gate of said triac and a second end connected to said diode and first ends of a capacitor and a second resistor, said capacitor and said second resistor having second ends connected to said AC input voltage.

41. The apparatus as defined in claim 40 wherein said latching means further includes a filter capacitor in parallel with said first resistor.

42. The apparatus as defined in claim 38 wherein said first thermal protection means is a resettable thermostat which automatically resets to electrically connect the AC input voltage to said transforming means when said temperature of said transforming means falls below said predetermined temperature.

43. The apparatus as defined in claim 38 wherein said transforming means is a step-down transformer including a primary winding and a secondary winding.

44. The apparatus as defined in claim 43 wherein latching means and said first thermal protection means are electrically connected to said primary winding.

45. The apparatus as defined in claim 43 further comprising indicating means connected to said secondary winding, said indicating means being energized when said first thermal protection means is not activated and the AC input voltage is being applied to said transforming means.

46. The apparatus as defined in claim 45 wherein said indicating means is a LED.

47. The apparatus as defined in claim 38 wherein said rectifying means is a full-wave AC to DC rectifier.

48. The apparatus as defined in claim 38 further comprising second thermal protection means connected to said transforming means for electrically disconnecting said transforming means from the AC input voltage when said temperature of said transforming means exceeds a maximum temperature which is greater than said predetermined temperature.

49. The apparatus as defined in claim 48 wherein said second thermal protection mean is a thermal fuse.

50. The apparatus as defined in claim 38 further comprising an electrical cord connected to said housing for supplying the AC input voltage to said power supply apparatus.

51. The apparatus as defined in claim 32 further comprising a first electrical cord connected to said housing for supplying the AC input voltage to said transforming means, and a second electrical cord connected between said housing and said adapter for transferring the DC output voltage produced by said rectifying means to said adapter.

52. The apparatus as defined in claim 51 wherein said housing further includes a battery charger and a receiving port adapted to receive the batteries.

53. The apparatus as defined in claim 52 wherein said battery charger is electrically and operatively connected to said transforming means.

54. The apparatus as defined in claim 52 wherein said housing includes a holding member.

55. The apparatus as defined in claim 51 wherein said housing includes a holding member.

56. A power supply apparatus for converting an AC input voltage to a DC output voltage and supplying the DC output voltage to a power tool, said apparatus comprising:

a housing;

transforming means provided in said housing and adapted to be electrically connected to the AC input voltage for reducing a voltage level of the input voltage;

first thermal protection means thermally connected to said transforming means for electrically disconnecting the AC input voltage from said transforming means when activated responsive to said transforming means exceeding a predetermined temperature;

latching means connected between said AC input voltage and said transforming means for allowing said input voltage to be applied to said transforming means when said latching means is activated after said first thermal protection means has been deactivated;

means electrically connected to said transforming means for rectifying the AC input voltage reduced by said transforming means into the DC output voltage which is supplied to the power tool; and an adapter electrically connected to said housing and constructed and adapted to be removably coupled to a battery compartment of the power tool for supplying the DC output voltage produced by said rectifying means to the power tool.

57. The apparatus as defined in claim 56 further comprising a first electrical cord connected to said housing for supplying the AC input voltage to said transforming means, and a second electrical cord connected to said housing and said adapter for transferring the DC output voltage produced by said rectifying means to said adapter.

* * * * *

UNITED STATES PATENT AND TRADEMARK OFFICE
CERTIFICATE OF CORRECTION

PATENT NO. : 6,243,276 B1  
DATED : June 5, 2001  
INVENTOR(S) : Peter W. Neumann It is certified that error appears in the above-identified patent and that said Letters Patent is hereby corrected as shown below:

Column 8,
Line 62, please delete "33" and insert -- 51 --.

Column 9,
Line 3, please delete "33" and insert -- 51 --.

Column 10,
Line 15, please delete "32" and insert -- 33 --.
Line 21, please delete "51" and insert -- 57 --.
Line 29, please delete "51" and insert -- 57 --.

Signed and Sealed this

Ninth Day of July, 2002

Attest:

JAMES E. ROGAN
Attesting Officer  Director of the United States Patent and Trademark Office